Dec. 2, 1952   J. HOHL ET AL   2,620,112
APPARATUS FOR SEALING CONTAINERS
Filed Nov. 2, 1950   6 Sheets-Sheet 5

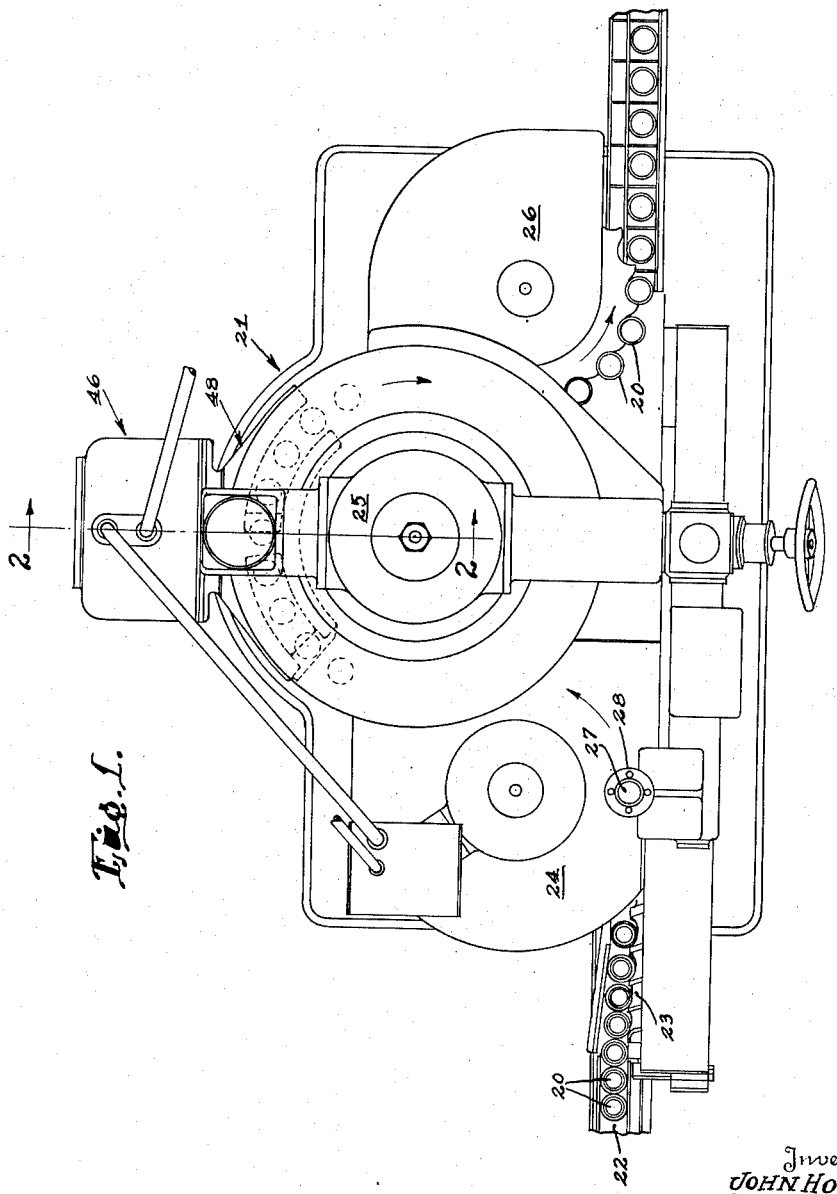

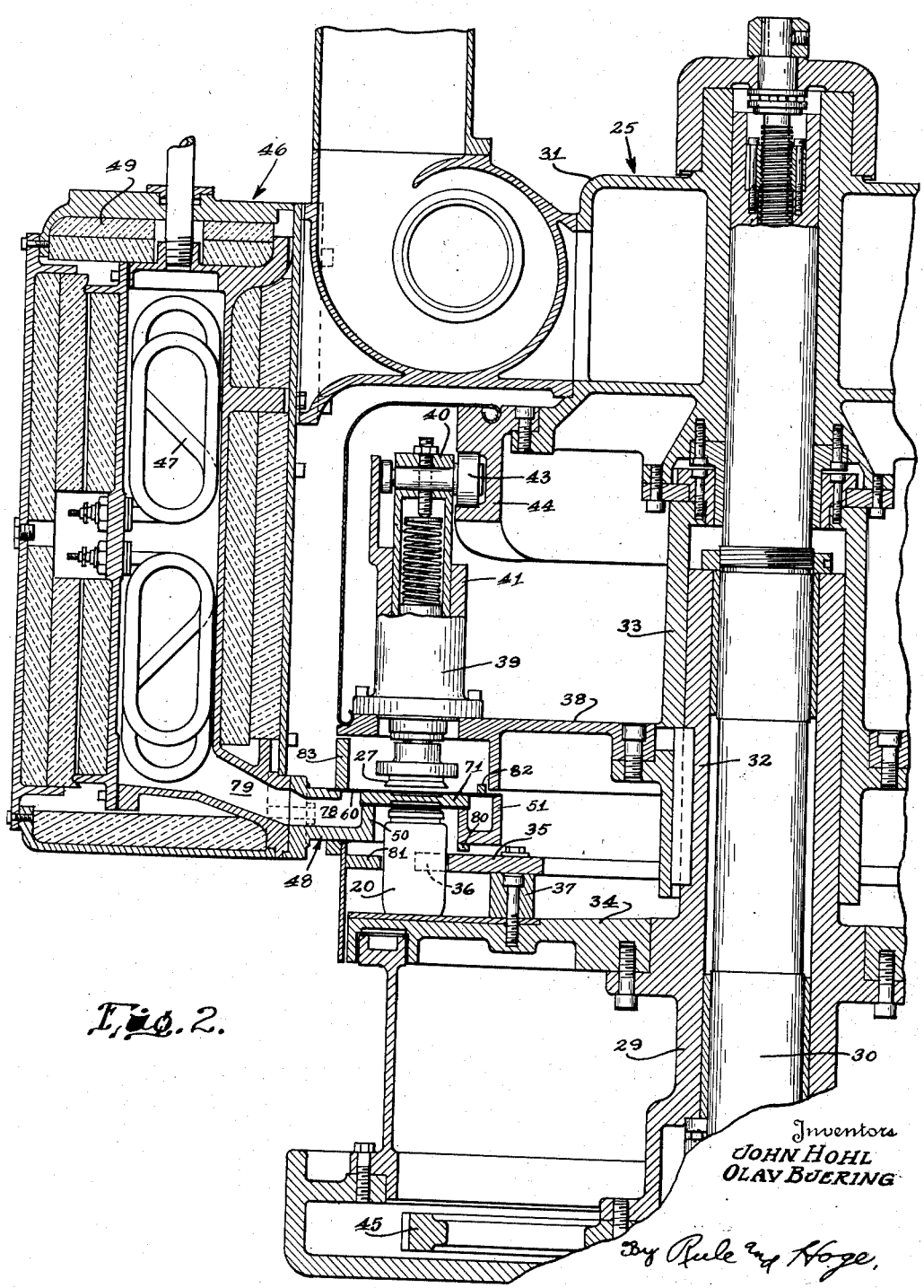

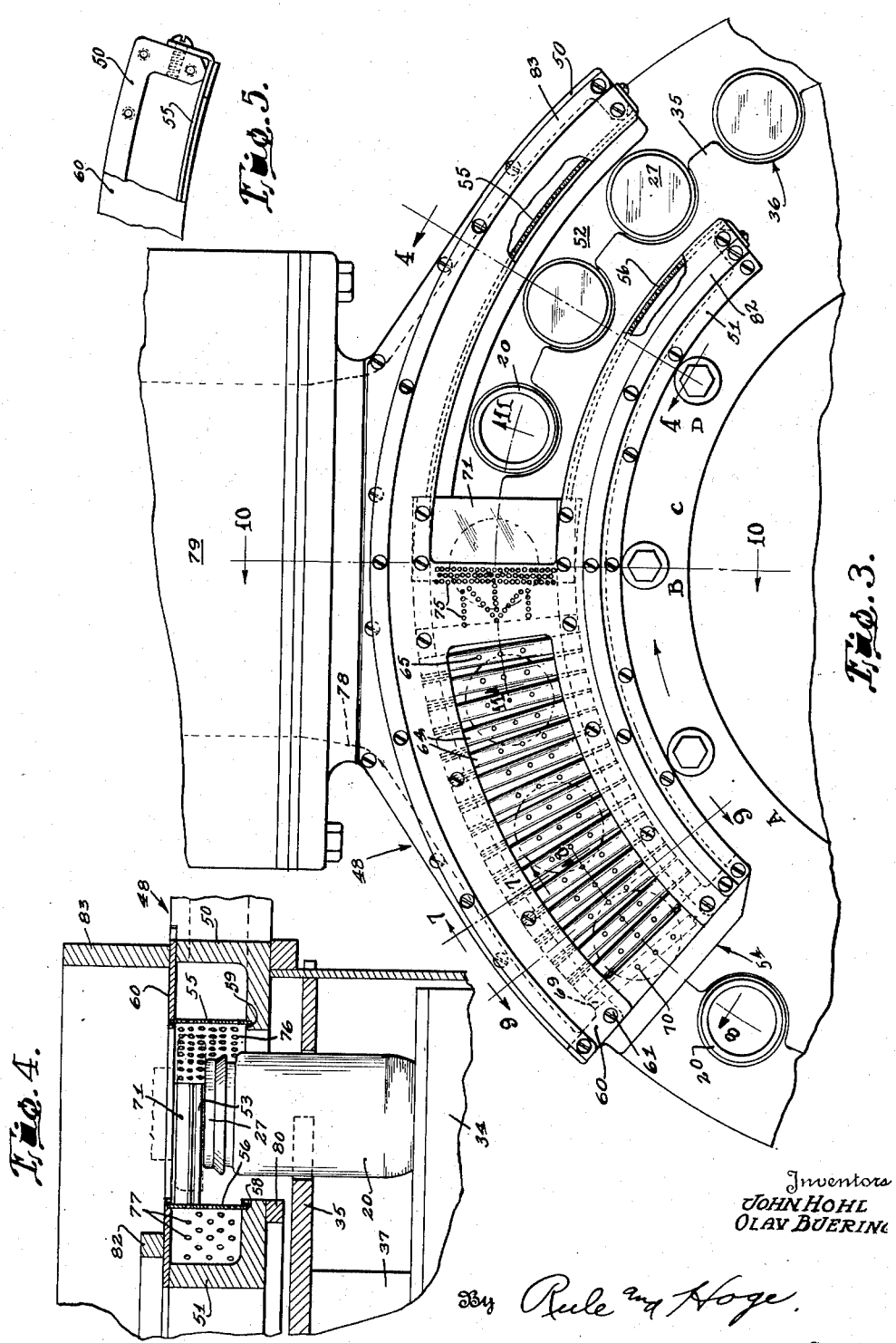

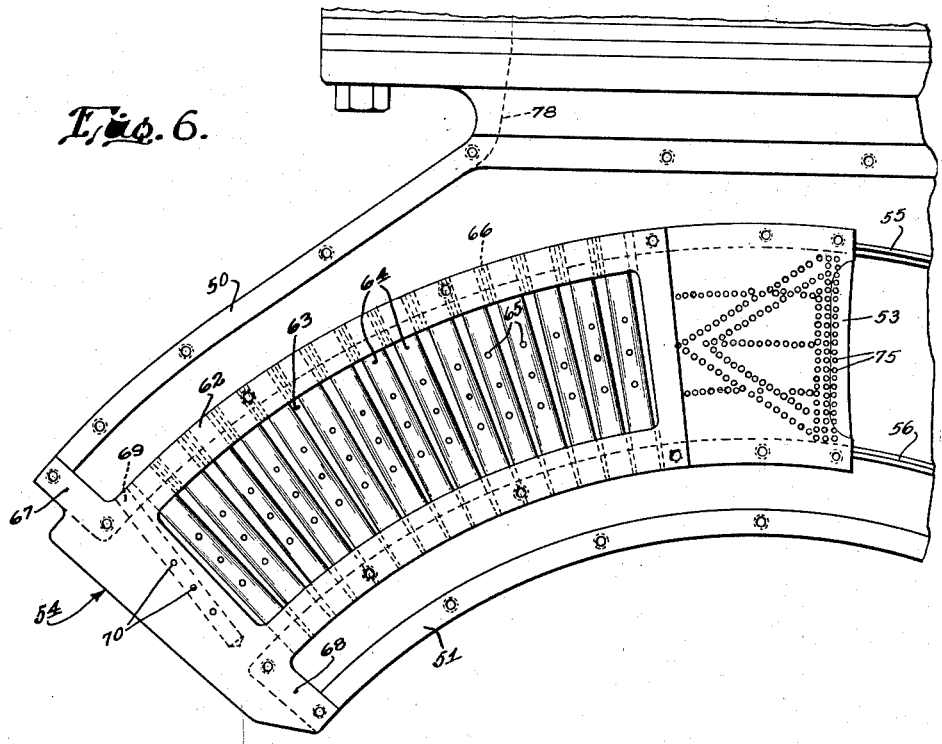
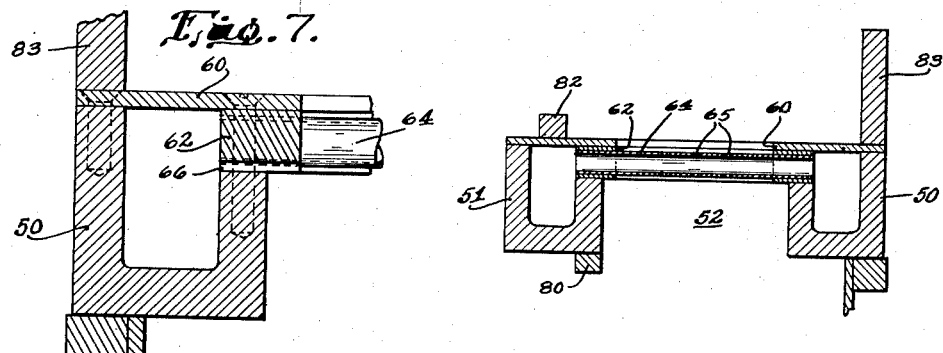
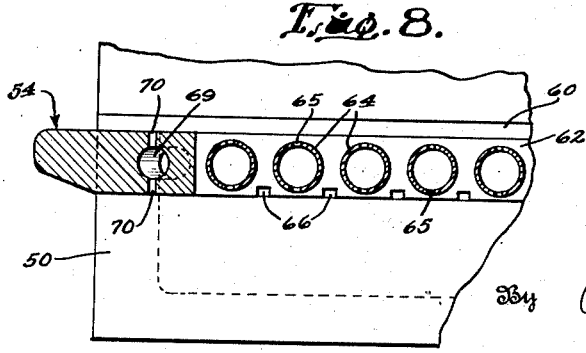

Inventors
JOHN HOHL
OLAV BJERING

By Rule and Hoge
Attorneys

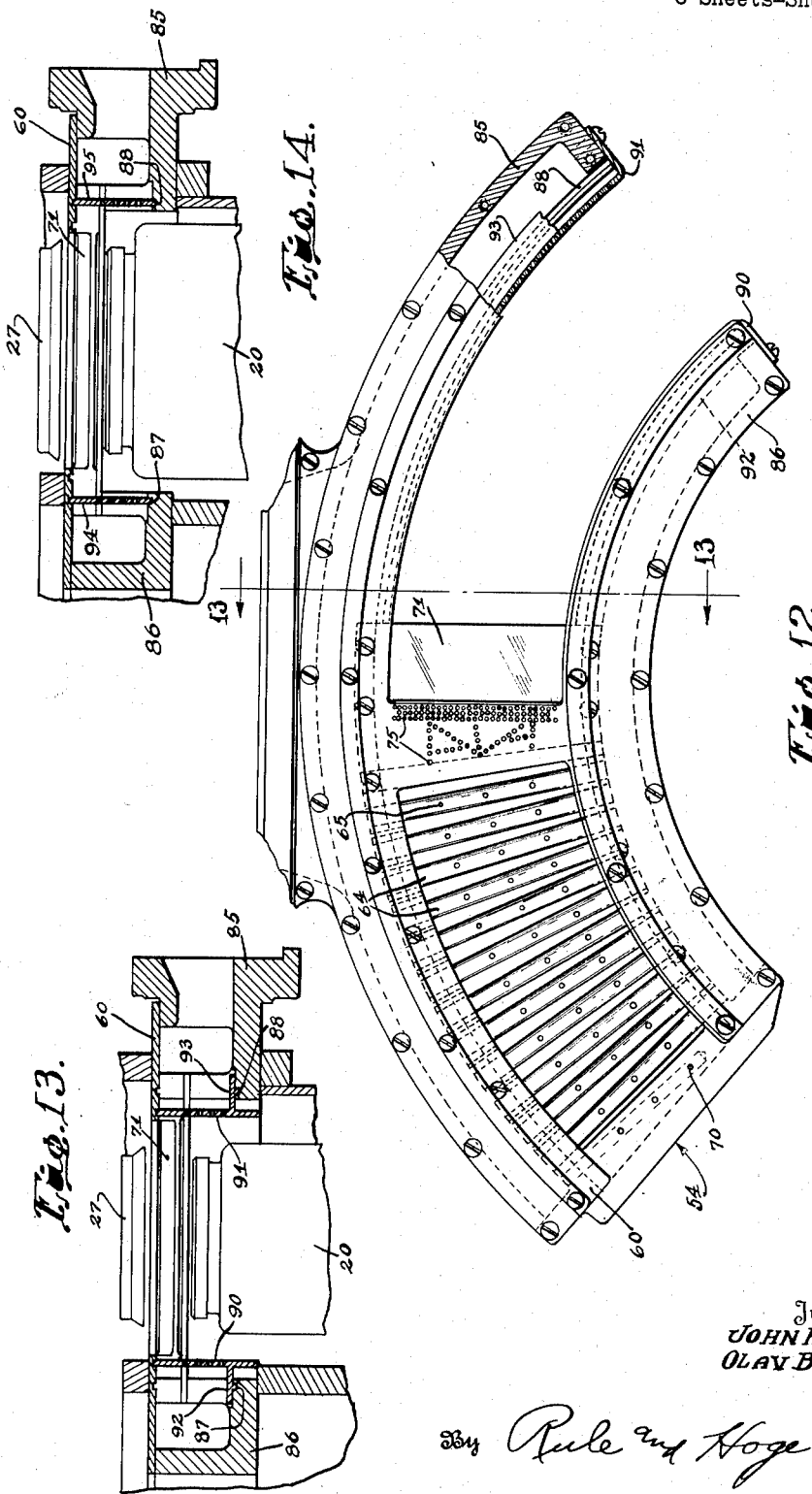

Patented Dec. 2, 1952

2,620,112

UNITED STATES PATENT OFFICE 2,620,112

APPARATUS FOR SEALING CONTAINERS

John Hohl and Olav Bjering, Toledo, Ohio, assignors to Owens-Illinois Glass Company, a corporation of Ohio Application November 2, 1950, Serial No. 193,653

3 Claims. (Cl. 226—82)

This invention relates to the packaging of commodities in containers and particularly to an apparatus and method for displacing the air in sealed containers.

A common principle employed in the sealing of commodities in containers is to displace the air in the container with an inert gas, or to displace the air with a vapor, such as steam, which, after sealing and cooling the container, condenses and creates a partial vacuum. Our invention relates to a new and improved apparatus for employing this principle in the displacement of air from both the cap and the container.

An object of the invention is to provide a means for distributing inert gas or vapor wherein the greater portion of the air is quickly removed from the cap and the container.

Another object of the invention is to provide a means for concentrating the flow of inert gas or steam at the point where the closure cap and container are brought together.

Another object of the invention is to provide a method and means such that the final sealing of the cap and container takes place in a flowing atmosphere of inert gas or vapor.

Other objects of the invention will appear hereinafter.

Basically, our invention comprises an apparatus for sealing containers by continuously moving caps and containers while in register above and below a gas or steam distributor and subjecting each to a series of streams or sheets of inert gas or vapor and finally sealing the caps to the containers while subjecting them to an atmosphere of gas or vapor.

This application discloses subject matter disclosed and claimed in our co-pending applications, Serial Nos. 152,541, and 152,542, filed March 29, 1950, titled "Method and Apparatus for Sealing Containers."

Referring to the accompanying drawings:

Fig. 1 is a diagrammatic plan view of a rotary sealing machine in which the present invention may be embodied and produced;

Fig. 2 is a part sectional elevation at the line 2—2 on Fig. 1;

Fig. 3 is a fragmentary plan view of the portion of the rotary machine including the steam distributor;

Fig. 4 is a sectional view at the line 4—4 on Fig. 3;

Fig. 5 is a fragmentary view of one end of the steam distributor;

Fig. 6 is a plan view of the left-hand portion of the steam distributor with the upper plate removed;

Fig. 7 is a sectional view at the line 7—7 on Fig. 3;

Fig. 8 is a sectional view at the line 8—8 on Fig. 3;

Fig. 9 is a sectional view at the line 9—9 on Fig. 3;

Fig. 12 is a plan view of a modified form of the steam distributor;

Fig. 13 is a sectional view at the line 13—13 on Fig. 12; and

Fig. 14 is a view similar to Fig. 13, the inner wall members being replaced by modified wall members.

Figure 10:
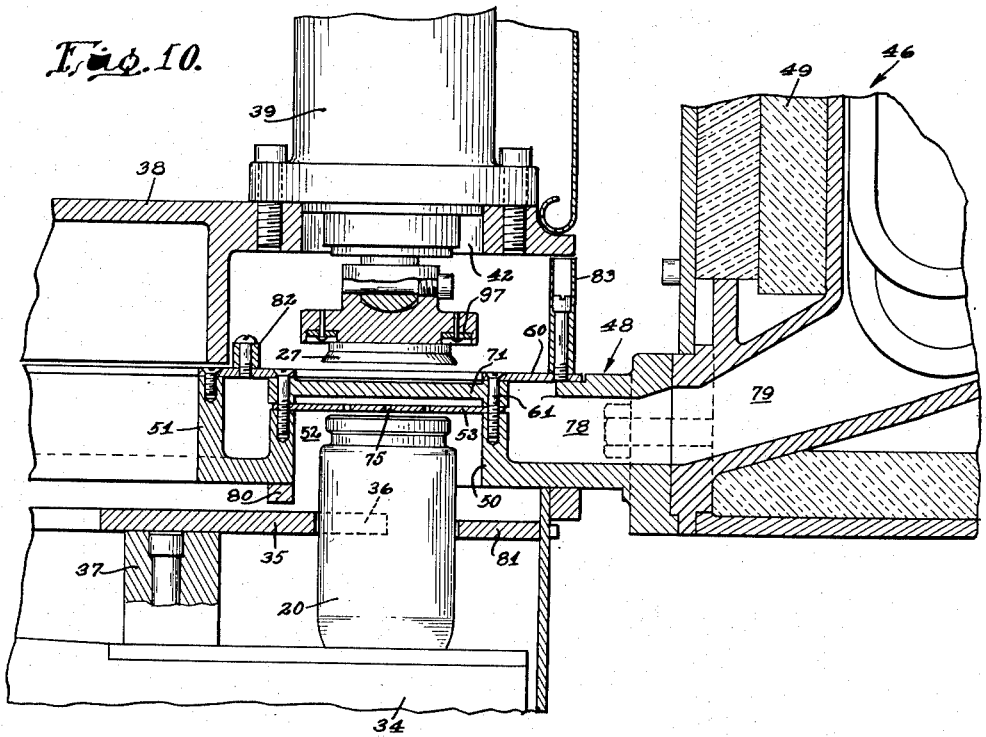
Fig. 10 is a sectional view at the line 10—10 on Fig. 3.

Referring to Fig. 1, previously filled containers 20 are fed into a sealing machine 21 by suitable means, herein shown as a conveyor 22 and a spiral spacer and timer 23. The sealing machine comprises three sections 24, 25 and 26. As the containers pass through the first section 24, caps or closures 27 are brought into register with the containers by suitable means shown schematically as 28, and travel about and in register with the containers.

The caps and containers are then transferred to the center section 25. In this section the caps and containers are subjected to inert gas or vapor and the caps are sealed to the containers as hereinafter described. The containers are then removed by the third section 26.

As herein described, superheated steam is used, but it should be understood that inert gases might be used as desired with obvious mechanical changes such as the removal of the superheater.

As shown in Fig. 2, the center section 25 comprises a carriage 29, arranged for rotation about a stationary vertical shaft 30. A non-rotating frame member 31 is positioned over the carriage and arranged for up-and-down adjustment on the shaft 30.

The carriage 29 comprises an inner sleeve 32 and an outer sleeve 33 splined to the sleeve 32 and adjustable up and down on said sleeve 32. The carriage also includes a circular table or platform 34 bolted to the sleeve 32. The containers 20 are supported on this platform 34 as they are carried through the inert gas or vapor distributor by the carriage. The containers are spaced on the platform by means of a spacing ring 35 formed with pockets or recesses 36, in which the containers are held, the ring 35 being bolted to the platform 34 and spaced thereabove by spacing blocks 37.

A chuck supporting table 38 is bolted to the outer sleeve 33 and supports an annular series of magnetic chucks 39. Each chuck 39 carries a series of magnets 91 (Fig. 10) by which it is magnetized for holding the caps. The chuck is keyed to a spindle 40 movable up and down in a casing 41, mounted over an opening 42 in the platform 38. The spindle 40 carries a roll 43 running in a cam track formed in a cam 44 which is bolted to the housing 31. The carriage is rotated by a gear 45 bolted to the sleeve 32, which gear is rotated by suitable means (not shown).

A superheater 46 is bolted to the member 31 and comprises electrical heating elements 47. A vapor distributor 48 is fastened to the superheater 47 in a manner hereinafter described. Suitable insulating materials 49 are provided around the steam superheater 47 and the distributor 48.

Figure 11:
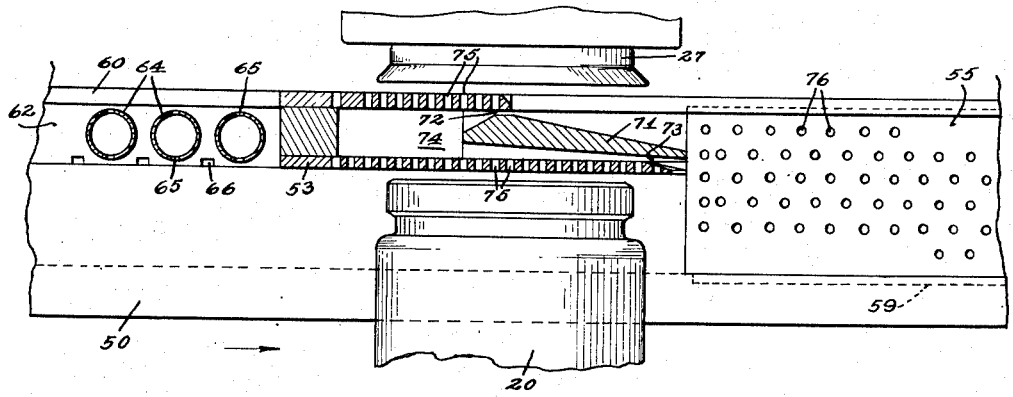
Fig. 11 is a sectional view at the line 11—11 on Fig. 3.

The distributor 48 is arc-shaped, as shown, for example, in Figs. 1 and 3. Structurally, it comprises outer and inner wall forming members or channels 50 and 51. The left-hand portion of these channels is U-shaped in cross section as shown in Fig. 9, and the right-hand portion of these channels is L-shaped in cross section as shown in Fig. 4. These channels serve as steam distributing devices as hereinafter disclosed. The channels 50 and 51 are spaced apart to provide a tunnel or passageway 52 into which the upper ends of the jars 20 project as they travel through the distributor (Fig. 10). As shown in Fig. 6, a plate 53 extends across the space between the channels at the center thereof. The right-hand edges of the plate 53 are bevelled (Figs. 6, 11). As shown in Fig. 9, the inner walls of the left-hand portion of the channels are of lesser height than the outer walls. A tube assembly 54 is positioned over the space between the inner walls of the left-hand portions of the channels. The inner walls of the right-hand portion of the distributor are formed by the members 55 and 56 which are set in slots 58 and 59 in the channel members and extend over the ends of the channels, as shown in Fig. 5.

An upper plate 60 overlies and forms a cover for the channels 50 and 51 and is attached to the channel walls by screws 61 (Fig. 3). The plate 60 extends across the full width of the steam distributor at the center thereof and thereby bridges the space between the two channels at that point. From the middle to either end of the distributor, the upper plate 60 is extended in the form of comparatively narrow strips covering the channels and leaving the tunnel 52 open, thus permitting steam to be injected into the caps 27 in the left-hand portion and permitting the caps 27 to be lowered to sealing position in the right-hand portion, as presently described.

As shown in Fig. 6, the tube assembly 54 comprises a body 62 of which the center portion between the channels is cut away to provide a space 63 in which tubes 64 are inserted. The tubes 64 extend throughout the width of the body 62 and thereby provide a passageway from one channel to the other. The tubes are provided with vertical holes 65. Transverse openings 66 are provided in the sides of the body 62 between the tubes 64. The ends 67 and 68 of the body are also situated in such a manner as to seal the ends of the channels 50 and 51. A hole 69 (Fig. 6) is drilled transversely of the body 62. Vertical openings 70 are also provided to this transverse hole (Fig. 8). A mouthpiece 71 is positioned at the center of the distributor above the plate 53 and is shaped so that slits or openings 72 and 73 are formed (Fig. 11). It can readily be seen that the space of channel 50 is connected to the space of the channel 51 through the tubes 64 and through the space 74 between the tube assembly and the mouthpiece 71 (Fig. 11.)

The lower plate 53 and the upper plate 60 are each provided with a multiplicity of narrowly spaced perforations 75. These perforations are arranged as shown in Figs. 3 and 6 so that the greatest number is at or near the end of the said plates which the containers last pass.

The inner channel wall members 55 and 56 are provided with perforations 76 and 77 respectively (Fig. 4). As shown in Figs. 2 and 3, the distributor is provided at its center with an opening 78 to a steam inlet 79 which in turn is open to the superheater 46. Guide rails 80 and 81 extend along the bottom of the distributor and serve as sealing means to keep air out in addition to guiding means (Fig. 10). The rail 82 and wall 83 above the level of the steam distributor provide a similar function (Figs. 3, 9 and 10).

The operation of the steam distributor may be summarized as follows:

As a container 20 supported on the rotating platform 34 (Fig. 2) approaches the steam distributor 48, a cap 27 is maintained in register with it by means of the magnetic chuck 39.

As the cap and container continue their travel, they pass successively into and through zones A, B, C and D (Fig. 3) of the steam distributor. Steam from the superheater 46 passes through the inlet 79 to the steam distributor through the opening 78 and then flows freely through the channel 50, the tubes 64, the space 74, the channel 51, and thereby to every part of the steam distributor and out of each of the openings and slits as hereinafter described.

As the cap and container approaches zone A (Fig. 3) they are subjected to a series of vertical streams of vapor emanating from the vertical openings 70 and the holes 65 in the tubes 64. At the same time the transverse streams of vapor from the openings 66 provide a blanket in the spaces between the tubes 64. The combined action of these streams of vapor serves to displace the air in the top of the container and in the closure cap.

The cap and container then move to zone B where the concentration of vapor is greater due to the greater number of proximate perforations 75.

As they continue their travel, cap and container enter zone C and move through the streams or sheets or vapor emanating in a forward direction through the slots 72 and 73. The action of these streams or sheets provides a final sweeping or scavenging action whereby air is removed from the cap and opening of the container, and the vapor also serves as a curtain to prevent infiltration of air into the steam distributing area.

The cap and container then move into zone D where an atmosphere of vapor is supplied by fine streams of vapor from the openings 76 and 77 in the channel walls of the steam distributor. In this zone, the cap is moved down and sealed on the container by the chuck 39 which is actuated by the cam 44. The sealed container is then removed from the machine by the section 26 (Fig. 1).

The particular arrangement of the perforations 75 (shown in Figs. 3 and 6) has been found preferable, but it should be understood that the arrangement may be modified without deviating from the spirit of our invention.

A modified form of our invention is shown in Figs. 12, 13 and 14. In this form of the invention, the inner channel wall members of the steam distributor 48 can be removed and replaced in order to accommodate containers of varying diameters. As shown in Figs. 12 and 13, the channels 85 and 86 are provided with slots 87 and 88 extending throughout the length of the right-hand portion of the distributor. When it is desired to accommodate containers of smaller diameter, channel wall members 90 and 91, having projections 92 and 93, are inserted in the slots 87 and 88. If it is desired to accommodate containers with larger diameters, the wall members 90 and 91 are removed and members 94 and 95 which are formed without projections are inserted directly into the slots 87 and 88 (Fig. 14). The top plate is provided with slots to receive the top of the channel wall members. The distributor is in all other respects identical with the form described above.

The invention as herein illustrated and described is adapted for use with superheated steam which we have found is desirable for use in packaging and sealing certain products, and may also be used with steam at lower temperatures or steam vapor which is preferable for use with certain other products. Still other inert gases may be used if desired. The term "inert gas" as herein used, includes superheated steam, steam vapor and any other gases such for example, as nitrogen and carbon dioxide, which do not include free oxygen or oxidizing agents and which are suitable for the specified purposes of our invention, and also includes combinations of such gases.

The invention is herein described as applied to a rotary sealing machine, but it should be understood that this does not limit the application of our apparatus to the rotary type since it may be satisfactorily applied to other types.

Modifications may be resorted to within the spirit and scope of our invention as defined in the appended claims.

We claim:

1. In a rotary sealing machine, a steam distributor comprising an outer arc-shaped channel, an inner arc-shaped channel concentric with and spaced inwardly from said outer channel, said channels having openings in the channel walls adjacent to said space for a portion of their length, vertically spaced plates bridging the space between said channels at their mid point thereby forming an enclosed space between said channels, tubes extending between said channel walls in the left-hand portion thereof thereby providing communication with said channels, said tubes being provided with vertical holes, a mouthpiece spaced at the right-hand end of the vertically spaced plates, said mouthpiece having a thickness less than that of the enclosed space and being tapered along upper and lower faces such that two converging slots are provided at the end of said plates, said plates being provided with a multiplicity of perforations in the space between the tubes and said mouthpiece, said perforations being so distributed that the greatest concentration of said perforations is at or near said mouthpiece, and means for introducing steam to said distributor so that it may flow through said openings, spaces, and slots.

2. In a container sealing apparatus, a steam distributor, means for continuously moving containers below a portion of said steam distributor, means for moving caps for said containers above a portion of said steam distributor and in register with said containers, said distributor having horizontal central portions cut away near the point of entrance to said distributor providing an opening, tubes extending transversely across said opening and spaced longitudinally along said distributor, said tubes having vertical perforations, said steam distributor being provided with a multiplicity of vertical perforations in the vicinity of the mid point along the path of said containers and caps, said steam distributor being provided with perforations along the sides in the portion extending from the mid point to the end of the path of said containers and caps, and means for sealing said caps to said containers while in said latter portion.

3. In a rotary sealing machine a steam distributor comprising an outer arc-shaped channel, an inner arc-shaped channel concentric with and spaced inwardly from said outer channel, said channels having openings adjacent to said space in the vicinity of the mid point of said channels, plates interposed between said channels above and below said openings thereby forming an enclosed space providing communication between said channels, a tube body sealing one end of said enclosed space, said tube body extending throughout the length of the left-hand portions of the distributor, said tube body having central portions cut away providing an opening, tubes spaced transversely across said opening and extending through said body to the channels, said tubes having perforations, a mouthpiece spaced in the other end of the enclosed space between the plates and having a thickness less than that of said enclosed space, the upper and lower faces of said mouthpiece being tapered such that two convergent slots are provided at the end of said distributor, said plates being provided with a multiplicity of vertical perforations in the space between the tube body and the mouthpiece, the greatest concentration of said perforations being at or near said mouthpiece, said channels being provided with transverse perforations on the inner portions adjacent to said space, means for introducing steam to said distributor so that it may flow through said openings, spaces and slots, means for continuously moving containers below a portion of said steam distributor, means for moving caps for said containers above said steam distributor in register with said containers, and means for sealing said caps to said containers while in the right-hand portion of the distributor.

JOHN HOHL.
OLAV BJERING.

REFERENCES CITED

The following references are of record in the file of this patent:

UNITED STATES PATENTS

| Number | Name | Date |
|---|---|---|
| 1,920,539 | White | Aug. 1, 1933 |
| 2,107,237 | Davies | Feb. 1, 1938 |
| 2,285,867 | Minaker | June 9, 1942 |
| 2,322,250 | Murch | June 22, 1943 |
| 2,337,170 | Wakeham | Dec. 21, 1943 |
| 2,339,035 | Stewart et al. | Jan. 11, 1944 |
| 2,359,671 | Pearson | Oct. 3, 1944 |
| 2,362,799 | Boyd et al. | Nov. 14, 1944 |
| 2,362,841 | Minaker | Nov. 14, 1944 |